(12) United States Patent  
Cook

(10) Patent No.: US 7,594,027 B1  
(45) Date of Patent: Sep. 22, 2009

(54) DATA ACCESS USING A MACHINE-READABLE CARD

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1247 days.

(21) Appl. No.: 10/406,171

(22) Filed: Apr. 3, 2003

(51) Int. Cl.
*G06F 15/173* (2006.01)

(52) U.S. Cl. .............. 709/241; 709/203; 709/217; 709/218; 709/219; 709/227; 709/231; 705/35; 705/44; 705/64; 705/68; 705/70; 705/33; 705/42; 705/43

(58) Field of Classification Search .......... 709/241, 709/203, 217, 218, 219, 227, 231; 705/35, 705/64, 44, 68, 70, 33, 42, 43
See application file for complete search history.

(56) References Cited

U.S. PATENT DOCUMENTS

| | | | |
|---|---|---|---|
| 5,452,350 A * | 9/1995 | Reynolds et al. | 379/221.07 |
| 6,430,276 B1 * | 8/2002 | Bouvier et al. | 379/121.01 |
| 6,983,256 B2 * | 1/2006 | Drummond et al. | 705/35 |
| 6,999,944 B1 * | 2/2006 | Cook | 705/44 |
| 2006/0118614 A1 * | 6/2006 | Rose | 235/380 |
| 2006/0173790 A1 * | 8/2006 | Park et al. | 705/64 |

* cited by examiner

*Primary Examiner*—Ario Etienne
*Assistant Examiner*—Barbara N Burgess

(57) ABSTRACT

A communication system is disclosed comprising a communication network and a communication device. The communication device reads machine-readable information from a card, wherein the information on the card corresponds to data hosted by a content provider in the communication network. The communication device processes the information to locate the content provider, and transmits a request for the data and the information to the communication network. The communication network processes the information to translate the data hosted by the content provider to a format suitable for the communication device. The communication network also processes the information to handle a financial transaction for the data.

24 Claims, 4 Drawing Sheets

DATA ACCESS USING A MACHINE-READABLE CARD

BACKGROUND OF THE INVENTION

1. Field of the Invention

The invention is related to the field of communication systems, and in particular, to systems and methods of transmitting data from a communication network to a communication device using information on a card.

2. Statement of the Problem

The Internet provides a wealth of data, programs, files, etc, that are accessible with an Internet connection of an access provider. Hundreds of content providers help to form the Internet. The content providers host data and allow users of the Internet to access the data. Each content provider has an Internet address that defines it location in the Internet. The Internet address may be defined by a Uniform Resource Locator (URL), such as http://www.companyx.com, to make the Internet address easier to remember. The data hosted by the content providers can also be accessed through a URL, such as http://www.companyx.com/data.

To find specific data on the Internet, such as a particular video, the Internet user needs to know how to navigate through the Internet to the proper content provider. Generally, this means that the Internet user must know the URL of the data or perform a proper search using one of the search engines. This may be difficult, as the Internet user may not know the URL of a particular video and may not be able to find it. Also, the volume of data on the Internet is so large that searching can be difficult. In searching for the video, a search engine may provide a hundred false hits before finding the video, if at all.

Once the video is found, the content provider hosting the video transmits the video to the computer or other device of the Internet user. The other devices being developed to access the Internet, are cell phones, Personal Digital Assistants (PDA), Palm Pilots, etc. A PDA, for instance, may not be able to receive a video from the content provider in the same format as a computer. The PDA may only be able to receive the video in MPEG2 for a 240×320 screen, while the computer can receive the video in MPEG4 for a 1024×1280 screen. In order for the PDA to be able to receive the video, the access provider, the content provider, or another system reformats the data in a format suitable for the target device. The user of the PDA needs to know the operating parameters of the PDA and provide those parameters to the system doing the formatting. Unfortunately, providing the operating parameters may be a task too difficult for most people to perform and is prone to human error.

Some of the data available on the Internet is free while other data is not. Some content providers ask for a credit card number before allowing access to data. There are also some payment services available for Internet purchases. Unfortunately, repetitiously entering payment information can be annoying and is again prone to human error.

SUMMARY OF THE SOLUTION

One example of the invention helps solve the above problems with an improved communication system comprised of a communication device and a communication network. The communication network includes a content provider that hosts data desired by a user of the communication device. The communication device reads a card that includes machine-readable information corresponding to the data hosted by the content provider. The communication device processes the information to locate the content provider in the communication network and transmits a request for the data. The communication network retrieves the data from the content provider. The communication network processes the information from the card to translate the data to a format suitable for the communication device. The communication network transmits the properly formatted data to the communication device. The communication device receives the data and provides or displays the data to a user of the communication device. The communication network also processes the information from the card to handle a financial transaction for the data.

The communication system advantageously allows a user of a communication device to quickly and easily access data in the communication network by obtaining a card that corresponds to the data. When the user reads the card with the communication device, the information on the card allows the communication device to automatically navigate the communication network to find the data. This can be advantageous to those unskilled in surfing the Internet. The information on the card allows the communication network to automatically format the data for the communication device. The information on the card allows the communication network to automatically handle a financial transaction for the data. This allows virtually any person to easily obtain data from the communication network by simply purchasing a card and reading it with a communication device.

Another example is a telephone network comprising an interface system and a processing system. The interface system is configured to connect to a communication device and a plurality of access providers. The plurality of access providers provides access to a content provider network. The interface system receives a request for a connection to an access provider from the communication device. The interface system transfers the request to the processing system. Responsive to the request, the processing system processes performance information for the plurality of access providers to select one of the access providers. The processing system then establishes a connection between the selected access provider and the communication device.

The invention may include other examples described below.

DESCRIPTION OF THE DRAWINGS

The same reference number represents the same element on all drawings.

DETAILED DESCRIPTION OF THE INVENTION

FIGS. 1-5 and the following description depict specific examples of a communication system to teach those skilled in the art how to make and use the best mode of the invention. For the purpose of teaching inventive principles, some conventional aspects of the communication system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
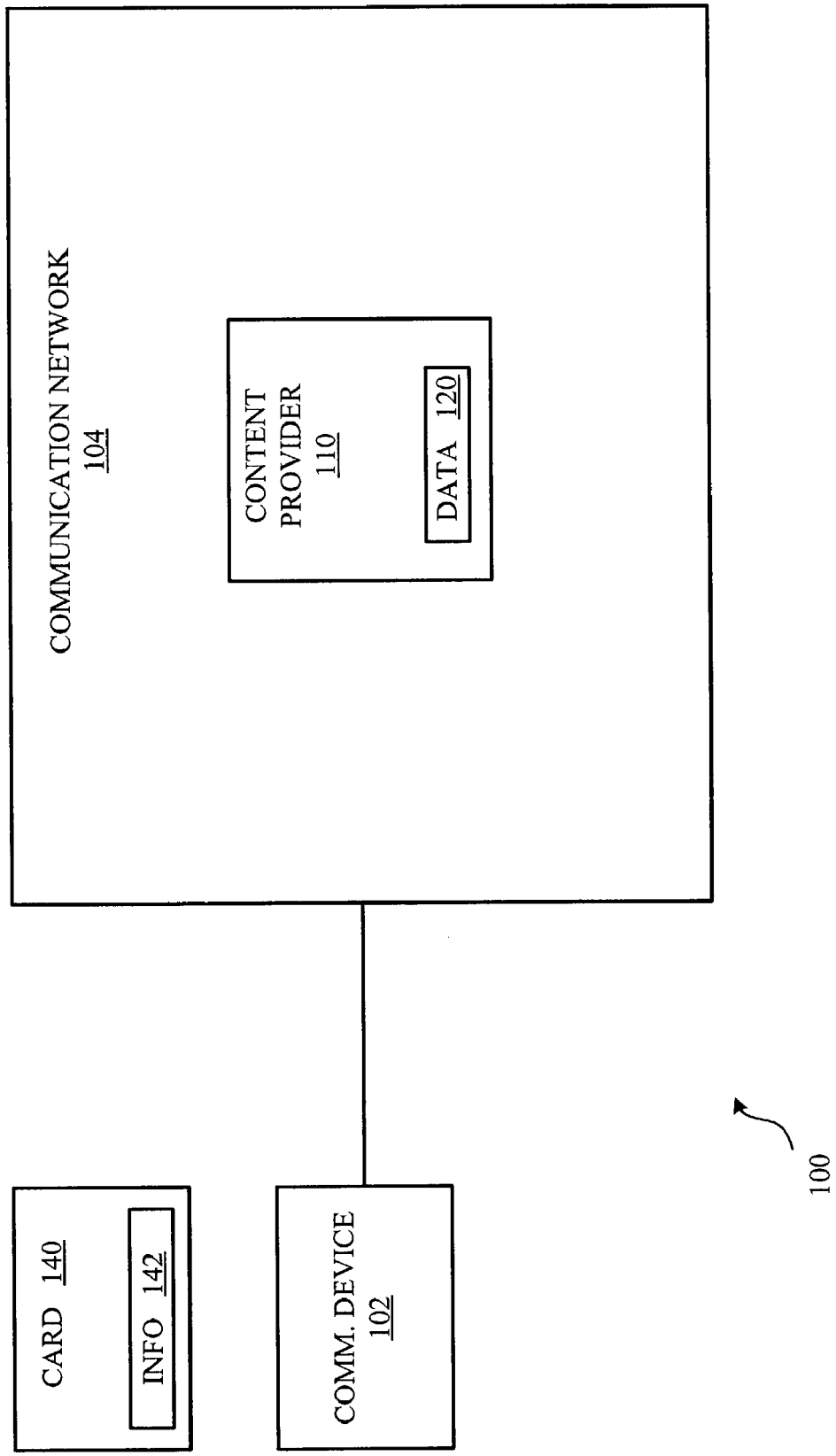
FIG. 1 illustrates a communication system in an example of the invention.

Communication System—FIG. 1

FIG. 1 illustrates a communication system 100 in an example of the invention. Communication system 100 is comprised of a communication device 102 and a communication network 104. Communication network 104 includes a content provider 110 that hosts data 120. Communication device 102 is configured to communicate with communication network 104 and content provider 110.

Communication device 102 is also configured to read a card 140 that includes machine-readable information 142. Card 140 may also include human-readable information. The information 142 corresponds to the data 120 hosted by content provider 110. The information 142 may correspond to the data 120 by including a URL or other addressing for the data 120, a URL and/or access information for content provider 110, data type, encoding, data delivery rate, Quality of Service (QoS), parameters, restrictions, authorizations, instructions, etc.

The following definitions may be helpful in understanding the invention. A card comprises any object that includes machine-readable information, where the information on the card corresponds to data hosted by a content provider in a communication network. Examples of the card resemble a credit card, a phone card, etc. A communication device comprises any device, devices, or systems configured to read machine-readable information from a card and communicate with a communication network. Examples of a communication device include a computer, a Personal Digital Assistant (PDA), a Palm Pilot, a cellular or PCS phone, etc. Data comprises any file, program, or set of information, such as streaming video, streaming audio, an MP3 file, an MPEG file, an HTML file, etc. A content provider comprises any device, system, or server hosting data that is accessible via a communication network, such as the Internet. A financial transaction comprises any transfer, or assurance of transfer, of funds, credit, etc, as consideration for a transaction. Examples of a financial transaction are deposits into bank account, credits to current accounts, etc.

In operation, communication device 102 reads the information 142 from card 140. Communication device 102 processes the information 142 to locate content provider 110 in communication network 104. Locating content provider 110 means having the requisite information to communicate with content provider 110, such as having an address for content provider 110. Communication device 102 may be connected to, or logged on to, communication network 104, or may connect to communication network 104 responsive to processing the information 142. Communication device 102 transmits a request for the data 120 to communication network 104. Communication device 102 also transmits the information 142 to communication network 104. Transmitting the information 142 means transmitting some or all of the information 142 read from card 140.

Communication network 104 receives the request for the data 120 and receives the information 142 read from card 140. Communication network 104, through content provider 110, retrieves the data 120. Communication network 104 processes the information 142 to translate the data 120 to a format suitable for communication device 102. For instance, communication network 104 may format the data 120 for a particular data rate for communication device 102, may format the data 120 for a particular display size for communication device 102, may format the data 120 for a particular display orientation for communication device 102, etc. Communication network 104 transmits the properly formatted data 120 to communication device 102. Communication device 102 receives the data 120 and provides or displays the data 120 to a user (not shown) of communication device 102.

Communication network 104 also processes the information 142 to handle one or more financial transactions for the data 120. For instance, the user of communication device 102 may have paid for card 140 (and consequently pre-paid for the data 120). The payment for card 140 goes to communication network 104 or its affiliates. Based on the transaction of providing the data 120, communication network 104 may then provide payment in some form to content provider 110 for providing the data 120. Based on this disclosure, those skilled in the art will appreciate how to modify existing communication systems to make communication system 100.

Figure 2:
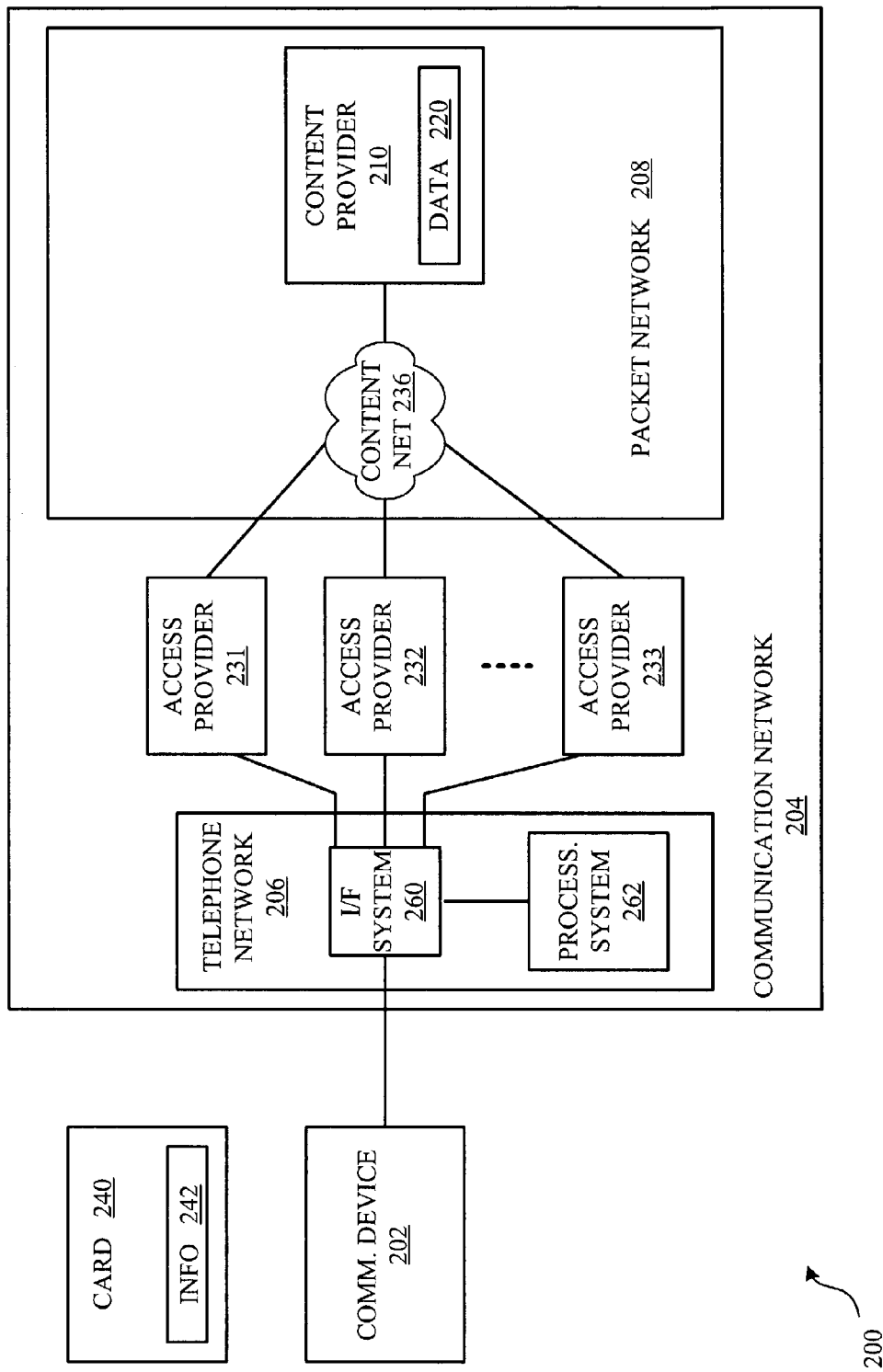
FIG. 2 illustrates another communication system in an example of the invention.

Another Communication System—FIG. 2

FIG. 2 illustrates a communication system 200 in an example of the invention. Communication system 200 is comprised of a communication device 202 and a communication network 204. Communication network 204 comprises a telephone network 206, access providers 231-233, and a packet network 208. Telephone network 206 may be comprised of interface system 260 and processing system 262. Packet network 208 is comprised of a content network 236, such as the Internet, and a content provider 210. Content provider 210 includes data 220.

Communication device 202 is configured to communicate with telephone network 206. Communication device 202 may communicate with telephone network 206 through a wire line connection or a wireless connection. Telephone network 206 is configured to communicate with access providers 231-233. Access providers 231-233 and content provider 210 are configured to communicate with content network 236. Access providers 231-233 and/or content provider 210 may be considered part of content network 236.

Communication device 202 is also configured to read a card 240 that includes machine-readable information 242. The information 242 corresponds to the data 220 hosted by content provider 210. The information 242 may correspond to the data 220 by including a URL or other addressing for the data 120, a URL and/or access information for content provider 210, etc.

The following definitions may be helpful in understanding this example of the invention. A telephone network comprises any switched network, such as a Public Switch Telephone Network (PSTN). A packet network comprises any network or system wherein nodes within the network communicate via packets or cells. A content network comprises any network or system that provides access to data, video, audio, or any other type of content. One example of a content network is the Internet.

In operation, communication device 202 dials up telephone network 206 to establish a connection to content network 236. Communication device 202 may transmit a request for a connection to telephone network 206. Alternatively, telephone network 206 may be able to recognize that the communication device 202 wants connection, based on the called number, digits entered by the caller, or other information. Responsive to the call from communication device 202, telephone network 206 selects one of the access providers 231-233 to provide communication device 202 access to content network 236. Telephone network 206 may select the access provider based on card parameters for latency, through-put, load levels, or other factors. Telephone network 206 then establishes a connection with the selected access provider 231. With the connection set up, communication device 202 is able to access content network 236 through telephone network 206 and access provider 231.

Communication device 202 reads the information 242 from card 240. With the connection to content network 236 already set up, communication device 202 processes the information 242 to locate content provider 210 over content network 236. The information 242 may include an address for the data 220 or content provider 210, which allows communication device 202 to automatically navigate content network 236 to the data 220. The address may be an IP address, a URL, etc. Communication device 202 transmits a request for the data 120 to content provider 210.

Communication device 202 may establish the connection to telephone network 206 and access provider 231 subsequent to reading the information 242 from card 240. For instance, the information 242 may include a telephone number for telephone network 206. Upon reading the telephone number, communication device 202 automatically dials the number to telephone network 206. Telephone network 206 then selects one of the access providers 231-233 as described above.

Communication network 204 receives the information 242 read from card 240. Content provider 210 receives the request for the data 220. Communication network 204 processes the information 242 to translate the data 220 to a format suitable for communication device 202. The translation may take place in access provider 231, content provider 210, or most likely in another device, system, or server (not shown) in communication network 204. Communication network 204 transmits the properly formatted data 220 to communication device 202. Communication device 202 receives the data 220 and provides or displays the data 220 to a user (not shown) of communication device 202.

Communication network 204 also processes the information 242 to handle a financial transaction for the data 220. Based on this disclosure, those skilled in the art will appreciate how to modify existing communication systems to make communication system 200.

EXAMPLE

FIGS. 3-5

Figure 3:
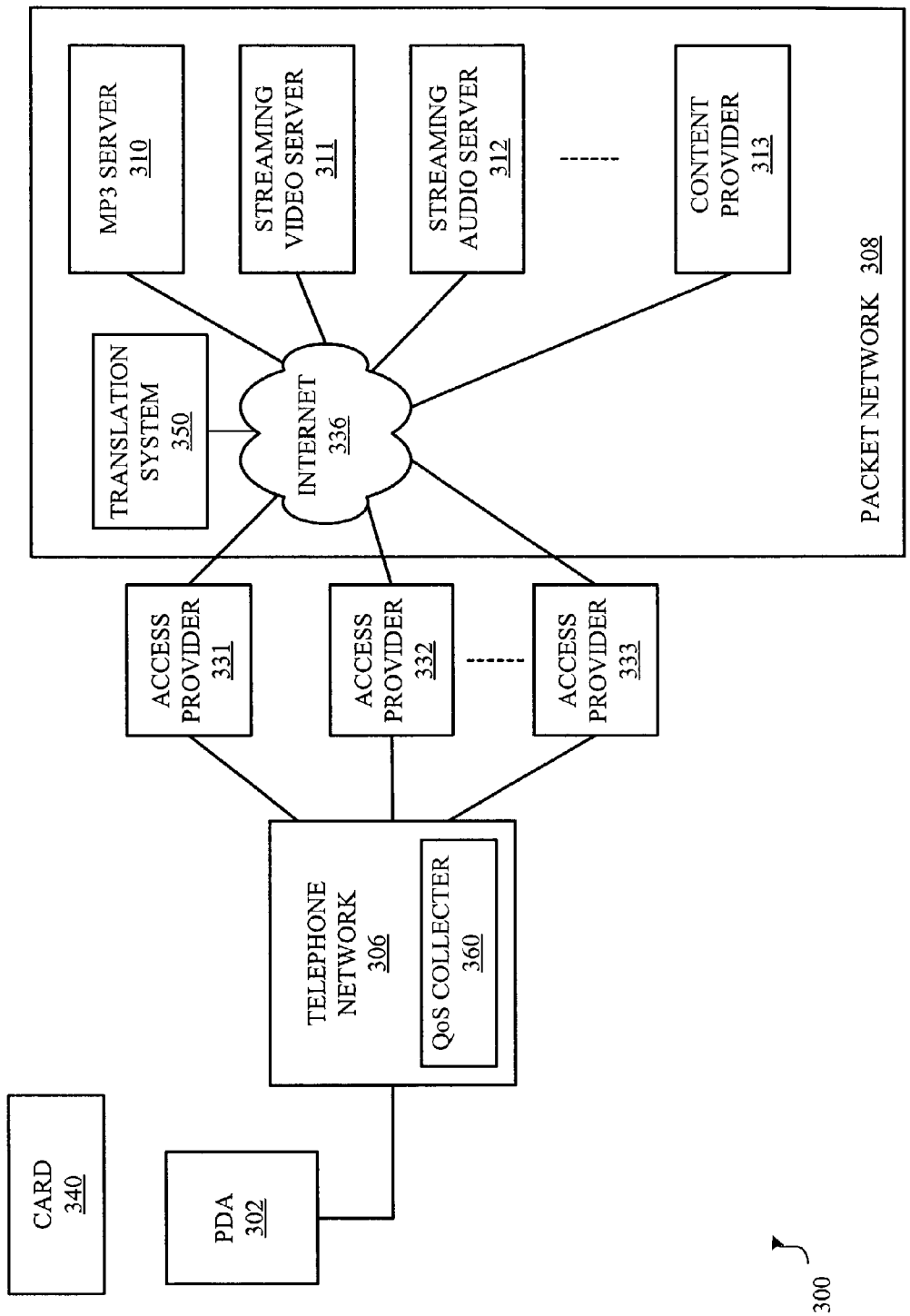
FIG. 3 illustrates another communication system in an example of the invention.

FIG. 3 illustrates a communication system 300 in an example of the invention. Communication system 300 is comprised of a Personal Digital Assistant (PDA) 302, a telephone network 306, access providers 331-333, and a packet network 308. Telephone network 306 includes, or is connected to, a Quality of Service (QoS) collector 360. Packet network 308 is comprised of the Internet 336, a translation system 350, an MP3 server 310, a streaming video server 311, a streaming audio server 312, and any other type of content provider 313.

PDA 302 is configured to communicate with telephone network 306. PDA 302 could communicate with telephone network 306 through a wire line connection or a wireless connection. Telephone network 306 is configured to communicate with access providers 331-333. Access providers 331-333, translation system 350, MP3 server 310, streaming video server 311, streaming audio server 312, and content provider 313 are configured to communicate with the Internet 336.

In operation, PDA 302 dials up telephone network 306 to establish a connection to the Internet 336. Telephone network 306 is able to recognize that the PDA 302 wants a content provider connection, based on the called number, digits entered by the caller, or other information. Telephone network 306 accesses content routing tables for possible connections, then QoS collector 360 to select one of access providers 331-333 to provide PDA 302 access to the Internet 336. QoS collector 360 collects performance information for the access providers 331-333, such as latency, through-put, load levels, or other information.

Telephone network 306 selects one of the access providers 331-333. Telephone network 306 may select an access provider 331-333 based on capacity, proximity, Quality of Service (QoS), etc. Telephone network 306 may also use information on card 340 to select an access provider 331-333. For instance, the information on card 340 may indicate whether the data being requested is streaming data or not. If the data is streaming data, then a higher QoS may be needed then if the data is not streaming data. Telephone system 306 may communicate with QoS collector 360 when considering the QoS provided by the access providers 331-333.

Telephone network 306 then establishes a connection with the selected access provider 331. With the connection set up, PDA 302 is able to access the Internet 336 through telephone network 306 and access provider 331.

Figure 5:
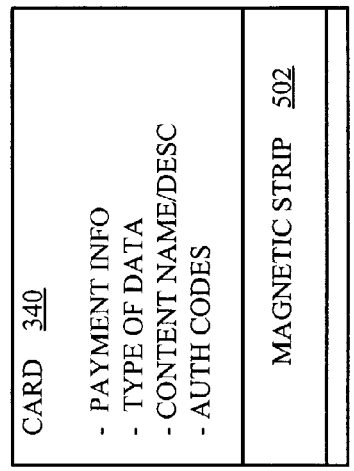
FIG. 5 illustrates a card in an example of the invention.
Figure 4:
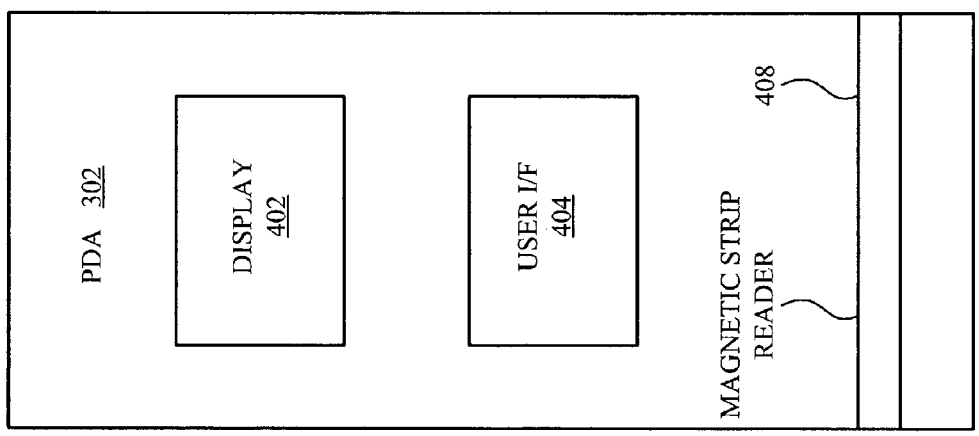
FIG. 4 illustrates a PDA in an example of the invention.

PDA 302 is configured to read card 340 that includes a magnetic strip. FIG. 4 illustrates PDA 302 in an example of the invention and FIG. 5 illustrates card 340 in an example of the invention. In FIG. 4, PDA 302 is comprised of a display 402, a user interface 404, and a magnetic strip reader 408. In FIG. 5, card 340 comprises magnetic strip 502. Magnetic strip 502 has a script encoded on it. A script comprises a type of computer code that can be directly executed by a program that understands the language of the script. The script may include the type of data to be obtained, billing or payment information for the data, content name or a description of the content, authorization codes, information on PDA 302, and other information. Card 340 corresponds to certain data, and is purchased (or given away) for the purpose of obtaining the data. Card 340 may have printed on it the type of data (such as songs, a video, etc.) for which it corresponds. Card 340 may also have printed on it the type of device that can be used to download the data for that card, payment information, or other information. As an example, if a person wants to purchase three songs in an MP3 format, then they purchase the card for those songs. If a person wants to purchase a video file, then they purchase the card for that video file. Also, if a PDA is being used, then the person purchases the card for PDA's. There may be many different cards for different types of data, for different devices, or for other factors. The PDA may "echo" a menu of content available for card 340.

To read card 340, a user of PDA 302 swipes card 340 through magnetic strip reader 408. PDA 302 automatically reads the script that is encoded on magnetic strip 502. PDA 302 processes the script to determine a location of the data to be obtained. For this example, assume that a video is to be obtained. PDA 302 determines the location of video server 311. The script may include an IP address of video server 311 to enable PDA 302 to easily navigate the Internet 336 to video server 311. PDA 302 transmits a request for the desired video file to video server 311 over the Internet 336. PDA 302 also transmits a script to packet network 308.

Video server 311 processes the request for the video file and the script. Video server 311 processes the script to authorize access to the video file. With access to the video file authorized, video server 311 locates the requested video file and transmits the video file to translation system 350. Translation system 350 processes the script and the video file to convert the video file into a format that is suitable for PDA 302. The script designates the size and orientation of display 404 of PDA 302 and formats the video file to properly fit to display 404. The script designates the data rate of PDA 302 for receiving data and formats the video file for transmission to PDA 302 at the proper data rate. The script may designate the transmission QoS for the video file. Translation system 350 may communicate with QoS collector 360 to determine the QoS of access providers 331-333. If the QoS is adequate, then translation system 350 transmits the video file. If the QoS is not adequate, then translation system 350 indicates an error.

PDA 302 receives the video file from packet network 308. The video file is in a format that PDA 302 is able to understand and process. PDA 302 processes the video file and displays the video to a user.

Telephone network 306 processes the script to handle a financial transaction for the purchase of the video file. Assume that telephone network 306, or one of its affiliates, put out the cards for purchase. When the user of PDA 302 purchases card 340 for the video file, then telephone network 306 receives payment for card 340. When the user accesses the video file through PDA 302, then telephone network 306 provides some type of payment to video server 311 for providing the video file. Telephone network 306 may transfer funds to a bank account for video server 311. Video server 311 may use telephone network 306 as a communication provider, and telephone network 306 may credit an account for video server 311. In any event, telephone network 306 automatically handles payment for the video file by processing the script.

Automatically reading the script from card 304 presents many advantages. The script allows PDA 302 to automatically navigate the Internet 336 to find the video file. This can be advantageous to those unskilled in surfing the Internet. Based on the script, the packet network 308 automatically formats the video file for PDA 302. And, telephone network 306 automatically handles the financial transaction for the video based on the script. This allows an unskilled person to easily obtain the correct form of data by purchasing a card and swiping it through a PDA or other device.

What is claimed is:

1. A communication system, comprising:
    a communication network comprising a content provider hosting data; and
    a communication device configured to read machine-readable information from a card, wherein the information on the card corresponds to the data hosted by the content provider in the communication network, process the information to locate the content provider in the communication network, transmit a request for the data, and transmit the information read from the card;
    wherein the communication network is configured to receive the request for the data and the information, process the information to identify a type of the communication device, translate the data hosted by the content provider to a format suitable for the communication device, translate the data for a size and an orientation of a display for the communication device, transmit the data to the communication device, and process the information to handle a financial transaction for the data;
    wherein the communication device is configured to receive the data and provide the data to a user of the communication device;
    wherein the communication network comprises a telephone network, a plurality of access providers, and a packet network;
    wherein the packet network comprises a content network and the content provider, wherein the plurality of access providers are configured to communicate with the content provider over the content network; and
    wherein the telephone network is configured to communicate with the plurality of access providers and the communication device, and process the information to select one of the access providers to connect the communication device to the content provider based on a Quality of Service (QoS) of connections to the plurality of access providers.

2. The communication system of claim 1 wherein the communication network is configured to:
    process the information to translate the data to a data rate suitable for the communication device.

3. The communication system of claim 1 wherein the information comprises a Uniform Resource Locator (URL).

4. The communication system of claim 1 wherein the information comprises an Internet Protocol (IP) address.

5. The communication system of claim 1 wherein the communication device is configured to read the information from the card by reading a magnetic strip.

6. The communication system of claim 1 wherein the communication device is configured to read the information from the card by reading a bar code.

7. The communication system of claim 1 wherein the communication network is configured to handle the financial transaction for the data by transferring credit to an account for the content provider.

8. The communication system of claim 1 wherein the telephone network is configured to:
    determine whether the data comprises streaming data; and
    if the data comprises streaming data, then determine whether the Quality of Service (QoS) is acceptable for the streaming data.

9. A method of automatically transmitting data from a communication network to a communication device, wherein the communication network includes a content provider hosting the data, the method comprising the steps of:
    reading machine-readable information from a card with the communication device, wherein the information on the card corresponds to the data hosted by the content provider;
    processing the information to locate the content provider in the communication network;
    transmitting a request for the data from the communication device to the communication network;
    transmitting the information from the communication device to the communication network;
    in the communication network,
        processing the information to identify a type of the communication device,
        processing the information to translate the data to a format suitable for the communication device, comprising the step of processing the information to translate the data for a size and an orientation of a display for the communication device,
        transmitting the data to the communication device, and
        processing the information to handle a financial transaction for the data; and
    in the communication device, receiving the data and providing the data to a user of the communication device;
    wherein the communication network comprises a telephone network, a plurality of access providers, and a packet network;
    wherein the packet network comprises a content network and the content provider, wherein the plurality of access providers are configured to communicate with the content provider over the content network; and
    wherein the telephone network is configured to communicate with the plurality of access providers and the communication device, and
    in the telephone network, processing the information to select one of the access providers to connect the communication device to the content provider based on a Quality of Service (QoS) of connections to the plurality of access providers.

10. The method of claim 9 wherein the step of processing the information to translate the data to a format suitable for the communication device comprises the step of:
    processing the information to translate the data to a data rate suitable for the communication device.

11. The method of claim 9 wherein the information comprises a Uniform Resource Locator (URL).

12. The method of claim 9 wherein the information comprises an Internet Protocol (IP) address.

13. The method of claim 9 wherein the step of reading machine-readable information from a card with the communication device comprises the step of:
reading a magnetic strip on the card.

14. The method of claim 9 wherein the step of reading machine-readable information from a card with the communication device comprises the step of:
reading a bar code on the card.

15. The method of claim 9 wherein the step of processing the information to handle a financial transaction comprises the step of:
transferring credit to an account for the content provider.

16. The method of claim 9 wherein the step of selecting the one access provider based on Quality of Service (QoS) comprises the steps of:
determining whether the data comprises streaming data; and
if the data comprises streaming data, then determining whether the Quality of Service (QoS) is acceptable for the streaming data.

17. A telephone network, comprising:
an interface system configured to connect to a plurality of access providers and a communication device, receive a request for a connection to an access provider from the communication device, receive the request from the communication device responsive to the communication device reading information from a machine-readable card, and transfer the request, wherein the plurality of access providers provide access to a content network comprising a content provider hosting data;
a processing system configured to receive the request, process the information from the machine-readable card to identify a type of the communication device, process the information to handle a financial transaction for the hosted data, translate the data hosted by the content provider to a format suitable for the communication device, process the information from the machine-readable card to translate the data for a size and an orientation of a display for the communication device, process performance information for the plurality of access providers to select one of the plurality of access providers to connect the communication device to the content provider based on a Quality of Service (QoS) of connections to the plurality of access providers, and establish a connection between the one access provider and the communication device, wherein the communication device is configured to receive the data and provide the data to a user of the communication device; and
a Quality of Service (QoS) collector configured to collect the performance information for the plurality of access providers, wherein the performance information includes load levels for the plurality of the access providers;
wherein the communication device is configured to:
read machine-readable information from a card, wherein the information on the card corresponds to the data hosted by the content provider in the communication network,
process the information to locate the content provider in the communication network,
transmit a request for the data, and
transmit the information read from the card.

18. The telephone network of claim 17 wherein the card corresponds to data on the content network and wherein the processing system is configured to handle a financial transaction for the data transmitted to the communication device over the connection.

19. The telephone network of claim 17 wherein the performance information includes latency for the plurality of the access providers.

20. The telephone network of claim 17 wherein the performance information includes through-put for the plurality of the access providers.

21. A method of operating a telephone network configured to connect to a plurality of access providers, wherein the plurality of access providers provides access to a content network comprising a content provider hosting data, the method comprising the steps of:
receiving a request for a connection to an access provider from a communication device;
receiving the request from the communication device responsive to the communication device reading information from a machine-readable card;
processing the information from the machine-readable card to identify a type of the communication device;
processing the information to handle a financial transaction for the hosted data;
processing the information from the machine-readable card to translate the data to a format suitable for the communication device, comprising the step of processing the information from the machine-readable card to translate the data for a size and an orientation of a display for the communication device;
processing performance information for the plurality of access providers to select one of the plurality of access providers;
establishing a connection between the one access provider and the communication device to connect the communication device to the content provider, wherein the communication device is configured to receive the data and provide the data to a user of the communication device;
transmitting the data to the communication device; and
collecting the performance information for the plurality of access providers, wherein the performance information includes load levels for the plurality of the access providers, and wherein the one access provider is selected based on a Quality of Service (QoS) of connections to the plurality of access providers;
wherein the communication device is configured to:
read machine-readable information from a card, wherein the information on the card corresponds to the data hosted by the content provider in the communication network,
process the information to locate the content provider in the communication network,
transmit a request for the data, and
transmit the information read from the card.

22. The method of claim 21 wherein the card corresponds to data on the content network and wherein the method further comprises the step of handling a financial transaction for the data transmitted to the communication device over the connection.

23. The method of claim 21 wherein the performance information includes latency for the plurality of the access providers.

24. The method of claim 21 wherein the performance information includes through-put for the plurality of the access providers.

* * * * *

UNITED STATES PATENT AND TRADEMARK OFFICE
CERTIFICATE OF CORRECTION

PATENT NO.       : 7,594,027 B1                                              Page 1 of 1
APPLICATION NO. : 10/406171
DATED            : September 22, 2009
INVENTOR(S)      : Fred S. Cook It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1916 days.

Signed and Sealed this

Twenty-eighth Day of September, 2010

David J. Kappos
*Director of the United States Patent and Trademark Office*